(12) United States Patent
Hall

(10) Patent No.: US 9,435,670 B2
(45) Date of Patent: Sep. 6, 2016

(54) OIL PORT POSITION SENSING DEVICE

(71) Applicant: Checkfluid Inc., London (CA)

(72) Inventor: Michael Bernard Hall, London (CA)

(73) Assignee: Checkfluid Inc., London (CA)

( * ) Notice: Subject to any disclaimer, the term of this patent is extended or adjusted under 35 U.S.C. 154(b) by 125 days.

(21) Appl. No.: 14/269,078

(22) Filed: May 2, 2014

(65) Prior Publication Data

US 2014/0327551 A1 Nov. 6, 2014

Related U.S. Application Data

(60) Provisional application No. 61/819,449, filed on May 3, 2013.

(51) Int. Cl.
*E21B 47/09* (2012.01)
*G01D 11/30* (2006.01)
*G01D 3/10* (2006.01)

(52) U.S. Cl.
CPC ............... *G01D 11/30* (2013.01); *G01D 3/10* (2013.01)

(58) Field of Classification Search
None
See application file for complete search history.

(56) References Cited

U.S. PATENT DOCUMENTS

| | | | | |
|---|---|---|---|---|
| 3,352,565 | A * | 11/1967 | Reynolds | B62D 55/116 180/22 |
| 5,223,822 | A * | 6/1993 | Stommes | F16K 37/0008 116/277 |
| 5,711,245 | A | 1/1998 | Knirck | |
| 6,059,642 | A * | 5/2000 | Kent | B23B 51/00 279/114 |
| 6,098,646 | A * | 8/2000 | Hennemann | A47L 15/44 137/101.19 |
| 6,778,063 | B1 | 8/2004 | Chen | |
| 6,978,196 | B2 | 12/2005 | Albertus | |
| 7,296,810 | B2 | 11/2007 | Thannikary et al. | |
| 7,739,978 | B2 * | 6/2010 | Beckman | F16K 37/0016 116/277 |
| 2003/0122421 | A1 * | 7/2003 | Hoff | E02F 9/02 305/144 |
| 2004/0094383 | A1 * | 5/2004 | Kinoshita | F16D 25/12 192/85.41 |
| 2005/0092335 | A1 * | 5/2005 | Bertrand | A61M 27/006 128/899 |
| 2005/0218312 | A1 * | 10/2005 | Thannikary | B62D 15/023 250/231.13 |
| 2005/0275557 | A1 * | 12/2005 | Newberg | F16B 31/028 340/686.4 |
| 2007/0285228 | A1 * | 12/2007 | Fortson | G01D 11/245 340/539.22 |
| 2013/0248563 | A1 * | 9/2013 | Baker | A61J 3/07 222/218 |

FOREIGN PATENT DOCUMENTS

KR 101038500 B1 6/2011

\* cited by examiner

*Primary Examiner* — Fekadeselassie Girma
*Assistant Examiner* — Chicco A Foxx
(74) *Attorney, Agent, or Firm* — Brunet & Co., Ltd.; Robert A. H. Brunet; Hans Koenig

(57) ABSTRACT

A portable apparatus for sensing position of an oil port on a rotating element (e.g. the wheel or track of a heavy vehicle) has a position sensor in electrical communication with a wireless transmitter. The wireless transmitter is configured to receive signals from the position sensor and to send signals to a wireless receiver. The apparatus further has a mounting structure (e.g. a magnet) for temporarily mounting the apparatus on the rotating element. An indicium on the apparatus associated with a desired service action to be performed on the rotating element correlates an angular position of the oil port to a pre-determined reference position of the position sensor, the angular position of the oil port being a correct position for performing the desired service action. In use, the apparatus is mounted on the rotating element so that the indicium points at the oil port and then the rotating element is rotated until the receiver indicates that the oil port is in the correct position.

2 Claims, 3 Drawing Sheets

OIL PORT POSITION SENSING DEVICE

CROSS-REFERENCE TO RELATED APPLICATIONS

This application claims the benefit of U.S. Patent Application 61/819,449, filed May 3, 2013, the entirety of which is incorporated herein by reference.

FIELD OF THE INVENTION

The present invention relates to sensors, particularly to sensors for determining position of an oil port on a rotating element of a vehicle.

BACKGROUND OF THE INVENTION

Many types of heavy equipment utilize final drives, differentials and transmissions. In some cases, the only way to access the oil in the transmission and final drive is through a single oil port that is located on the equipment's wheel or track. Depending on the service action that is required, the oil port must be positioned differently. To fill the oil, the oil port must be located at the top of the wheel or track. To drain the oil, the oil port must be located at the bottom of the wheel. Oil sampling and level checking also require the oil port to be positioned differently in relation to the ground.

To position the oil port for each service action often requires two people. One person needs to drive the equipment so that the wheels and tracks rotate the oil port into the correct position and another person watches the oil port to signal to the driver that the oil port is in position. If only one person is available, the process is time consuming. The single person must get into the equipment to drive forward or backward and then the same person must get back out of the equipment to check the oil port. The process is repeated until the oil port is in the correct location.

Sensors have been used in the automotive arts for a number of purposes. The following are some examples. US 2007-285228 describes a retrofit sensor with wireless communication capability. The sensing unit is self-contained and may be mounted on a vehicle in different ways, including magnetism. The sensor can be used to monitor functional characteristics, faults and other conditions, and may be applied to oil and fluid ports on a vehicle. The sensor comprises a "speed sensing device". However, the sensor does not provide information about the position of the oil port on a rotating wheel or track, nor can the sensing device correlate oil port position to the orientation of the sensing device.

KR 101038500 discloses a wireless sensing device for determining the state of a butterfly valve. The device comprises a sensing terminal on a rotating shaft and a sensor unit that measures the rotation angle of the rotating shaft by detecting the position of the sensing terminal.

U.S. Pat. No. 7,296,810 describes a method and apparatus for determining relative position of relatively movable members. The sensor includes a body mountable in a predetermined position to a first member, and a coupler being adjustably connectable to a second member and connectable in predetermined relation to an input of the sensor for coupling the input to the second member. The coupler is adjustably connectable to the second member in a predetermined relation to the first member such that when the input is connected to the coupler and the body is mounted in the predetermined position on the first member. The input and the body portion will be relatively positioned such that the sensor will provide a predetermined signal when the first and second members are in predetermined relative position. This document does not describe correlating oil port position to the orientation of a sensing device.

U.S. Pat. No. 5,223,822 describes a valve position indicator that has graphical information written on a drum that rotates with a valve actuator shaft. Rotation of the actuator shaft opens and closes the valve and the graphical information is correlated to the open or closed state of the valve, which depends on the rotational position of the actuator shaft. Sensors can also be used to determine the rotational position of the actuator shaft.

U.S. Pat. No. 6,978,196 describes a method of identifying a valve on a vehicle wheel. The method used an rf emitting tool to excite an identifier in a valve that then transmits data to a receiver connected to a computer.

U.S. Pat. No. 6,778,063 describes an angular position sensor for determining the angular position of a rotating shaft.

U.S. Pat. No. 5,711,245 describes a vehicle a method and apparatus for aligning a vehicle fluid output port with an external receptacle. The apparatus is based on an extendible flag that can be used as a reference.

There remains a need in the art for a simple, efficient method by which a single operator can determine the position of an oil port on a rotating element.

SUMMARY OF THE INVENTION

The present invention provides an apparatus and method for determining whether an oil port on a rotating element is in a proper position for a desired service action.

In one aspect of the present invention, there is provided a portable apparatus for sensing position of an oil port on a rotating element, the apparatus comprising: a position sensor in electrical communication with a wireless transmitter, the wireless transmitter configured to receive signals from the position sensor and for sending signals to a wireless receiver; a mounting structure for temporarily mounting the apparatus on a rotating element; and, an indicium on the apparatus associated with a desired service action to be performed on the rotating element, the indicium correlating an angular position of the oil port to a pre-determined reference position of the position sensor, the angular position of the oil port being a correct position for performing the desired service action.

In another aspect, there is provided a method for correctly positioning an oil port on a rotating element for performing a desired service action on the rotating element, comprising: mounting the apparatus of the present invention on the rotating element so that the indicium points at the oil port; receiving position signals from the transmitter with a wireless receiver; and rotating the rotating element until the receiver indicates that the oil port is in the correct position.

The position sensor may comprise any suitable sensor, for example an orientation sensor, an accelerometer, an inclinometer or the like. Such sensors are generally known in the art and are available commercially. Of particular note are sensors currently being used in mobile electronic devices to detect screen orientation. Examples of the sensors include 2- or 3-axis accelerometers from companies such as STMicroelectronics, Analog Devices, Bosch, Freescale Semiconductor and others.

Wireless transmitters and wireless receivers and associated electronic circuitry useful in the present invention are also generally known devices in the art. The wireless transmitter and/or receiver may be commercially available as part of a package with the position sensor. Wireless transmitters in conjunction with position sensors are available from Sherborne Sensors, Vigor Digital, BeanAir and Load Systems International. The GS010 Wireless Angle Sensor from Load Systems International is one example. The transmitter is configured to receive signals from the position sensor and then sends signals to the receiver. The transmitter and or receiver may comprise indicators, for example lights, textual readouts, audible elements and the like, that provide an indication of the state of the position sensor. A single receiver may be configured to receive signals from one or more than one transmitter. Thus, a single transmitter may be used to monitor oil port position on more than one rotating element by mounting an apparatus of the present invention on each rotating element where the transmitters in each apparatus are configured to send signals to the one receiver. The receiver may comprise indicators associated with each transmitter. Electronic components may be powered by a source of electricity, for example, one or more batteries, capacitors and the like.

The apparatus may also comprise a housing to house the position sensor and/or transmitter along with the circuitry to configure the sensor and transmitter to protect them from external conditions. The housing may also be conveniently used to facilitate mounting the apparatus to the rotating element and/or to provide a surface on which the indicium is placed.

Since the apparatus is portable, it is designed to be temporarily mounted on the rotating element. Temporary mounting may be accomplished, for example, with the use of a magnet affixed to the apparatus, with a releasable adhesive (e.g. tape or glue), or with a structure that may be supported by one or more pre-existing features on the rotating element. If a housing is used, the housing it is generally convenient to mount the housing to the rotating element.

The apparatus has an indicium correlating an angular position of the oil port to a pre-determined reference position of the position sensor, where the angular position of the oil port is a correct position for performing the desired service action. There may be one indicium or two or more indicia on the apparatus. Each indicium may be associated with a separate service action. Service actions include, for example, filling the rotating element with oil, draining oil from the rotating element, sampling oil in the rotating element, level checking oil in the rotating element. Preferably there is an indicium for each service action. Filling requires the oil port to be proximal the vertical axis proximal the top of the rotating element, draining requires the oil port to be proximal the vertical axis proximal the bottom of the rotating element, sampling requires the oil port to be somewhat radially offset (e.g. about 10-35°, for example about 30°) from the vertical axis in the lower part of the rotating element and leveling requires the oil port to be proximal the horizontal axis. The vertical and horizontal axes are defined as perpendicular to the rotational axis of the wheel, where the vertical axis is perpendicular to the ground and the horizontal axis is parallel to the ground.

Indicia may be any suitable marking that can readily identify the direction of the oil port in relation to the apparatus when the apparatus is mounted on the rotating element. Examples of an indicium are a word (or words), an arrow, a line, a series of collinear discrete marks, etc. Indicia may be printed on the apparatus or may comprise molded or other three-dimensional features on the apparatus. Words or other textual markings may be used to identify specific service actions associated with the indicia. The indicia are preferably located on a housing that houses the position sensor and other electronic components.

Although the apparatus can have any cross-sectional shape (e.g. square, rectangular, oval, circular), the apparatus is preferably circular since rotating elements such as wheels and tracks are normally circular. Circular housings can be conveniently used to both protect the electronic components and provide a circular shape to the apparatus. Indicia are preferably disposed circumferentially around the apparatus.

The indicium is correlated to a pre-determined reference position of the position sensor. Any position of the position sensor can be the pre-determined reference position as the invention utilizes a correlation between the position of the position sensor and the indicium to identify the correct angular location of the oil port on the rotating element. As long as the indicium is correctly placed on the apparatus to satisfy this correlation, the actual position used for the pre-determined position is not important.

In use, the apparatus is mounted on the rotating element so that the indicium indicates the direction of the oil port on the rotating element. Where more than one indicium is present, the apparatus is mounted on the rotating element so that the indicium associated with the desired service action is the one indicating the direction of the oil port. The apparatus may be designed to be mounted at any location on the rotating element, but it is preferable to design the apparatus to be mounted on the rotating element so that is centered on the axis of rotation of the rotating element. In this way the apparatus is suitable to be used with any diameter rotating element and greatly simplifies the electronics associated with the sensor, transmitter and receiver.

With the apparatus mounted the rotating element with the indicium indicating the direction of the oil port, a signal is sent from the sensor to the transmitter and then to the receiver. If the angular position of the oil port on the rotating element is not correct, the position sensor will not be in the pre-determined reference position and one or more indicators on the transmitter and/or receiver will indicate this. When the angular position of the oil port on the rotating element is correct, the position sensor will be in the pre-determined reference position and the one or more indicators on the transmitter and/or receiver will change to indicate that the oil port is now correctly positioned. Since the correct position of the oil port is within a range, the sensor and associated electronics can be programmed to indicate correct positioning sensor is within a defined range around the reference position. In addition, an indicator on the transmitter and/or receiver may be used to indicate when the position sensor is approaching the correct position to provide an operator a preliminary indication so that the rotating element may be slowed as the correct position is being approached. Because the position information is wirelessly transmitted to the operator, the operator will know when the correct position has been achieved and can stop the rotating element.

The invention is useable in any application where it is desired to correctly position a feature on a rotating wheel in relation to an action desired to be performed on the wheel. In the context of vehicles and oil ports, the invention is useful for heavy equipment, such as large trucks, bulldozers, farm equipment, forestry equipment, etc., that have oil ports on wheels, tracks, planetary gear drives or other rotating elements of the vehicle.

Advantageously, only a single person is needed to put a vehicle, and hence the oil port, in the correct position for the desired service action. The invention allows a single person to efficiently orient the oil port without needing to leave the vehicle. A vehicle operator will know when to stop the vehicle without needing to get in and out of the vehicle to check on the position of the oil port. Further, because the apparatus is portable, a service person can take the apparatus from location to location so that there is no need for separate apparatuses for each vehicle.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

In one embodiment, the invention pertains to an apparatus that senses the position of a rotating oil port on a heavy vehicle wheel or track. According to one aspect of the invention, an orientation sensor such as a 2- or 3-axis accelerometer and associated electronics is enclosed in a protective housing that is temporarily mounted on a front face of the wheel or track via a magnet or other means. On the orientation sensor housing are several indicators. By rotating the orientation sensor, the user can choose which oil port orientation is desired. Some of the indicators include but are not limited to oil port fill position (oil port is at the top of the wheel), drain position (oil port at bottom), level check position (oil port at mid-range) and oil sampling position (oil port between bottom location and mid-range location). In one aspect, the orientation sensor housing contains a light that is illuminated when the oil port reaches the desired position. Furthermore a receiver unit communicates wirelessly with the orientation sensor to alert a user in the driver's seat of the vehicle when the oil port has reached the desired position. The user is alerted using a light or a sound. Furthermore, multiple orientation sensors can be positioned on multiple wheels or tracks and the user is alerted using different colored lights and/or different tones when the multiple oil ports are in the desired position.

Figure 1:
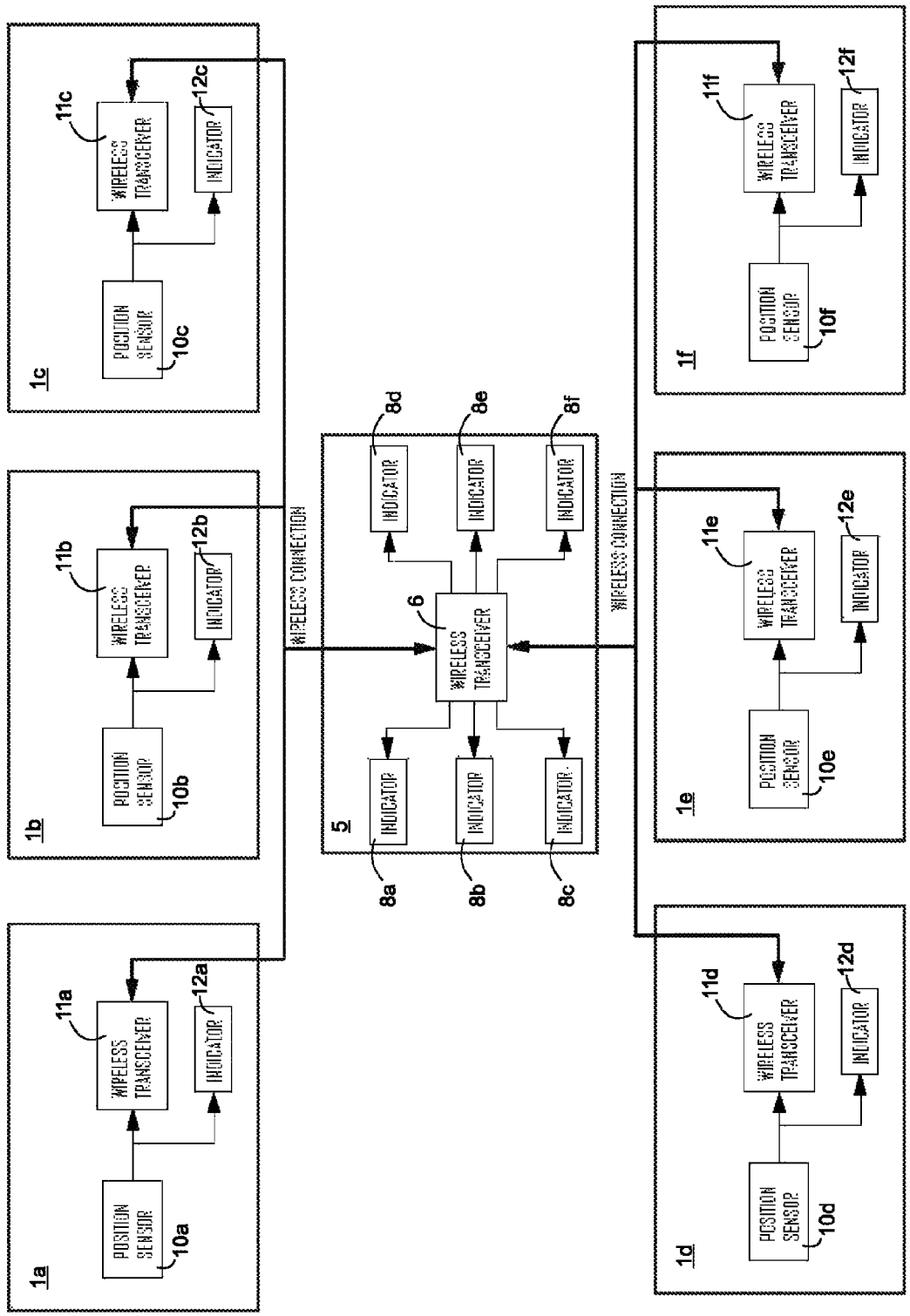
FIG. 1 is a block diagram showing how position sensors in six apparatuses of the present invention communicate with a single hand held receiver.

Referring to FIG. 1, a block diagram shows how position sensors 10a-10f in six apparatuses 1a-1f of the present invention mounted on six separate wheels or tracks communicate with a single hand held receiver 5. Position data from position sensors 10a-10f is transmitted to wireless transceivers 11a-11f, respectively, within each of the apparatuses 1a-1f, respectively. This data is wirelessly transmitted to wireless transceiver 6 in the hand held receiver 5, which controls indicator lights 8a-8f in the hand held receiver. The indicator lights are different colors to more readily distinguish them. When a position sensor, for example 10a is in a pre-determined reference position, the corresponding indicator light, in this case 8a, is caused to switch on. In addition, the apparatuses comprise indicator lights 12a-12f, which also light up when the position sensors 10a-10f, respectively, are in the pre-determined reference position. When a position sensor is not in the pre-determined position, the corresponding indicator lights are switched off.

Figure 2A:
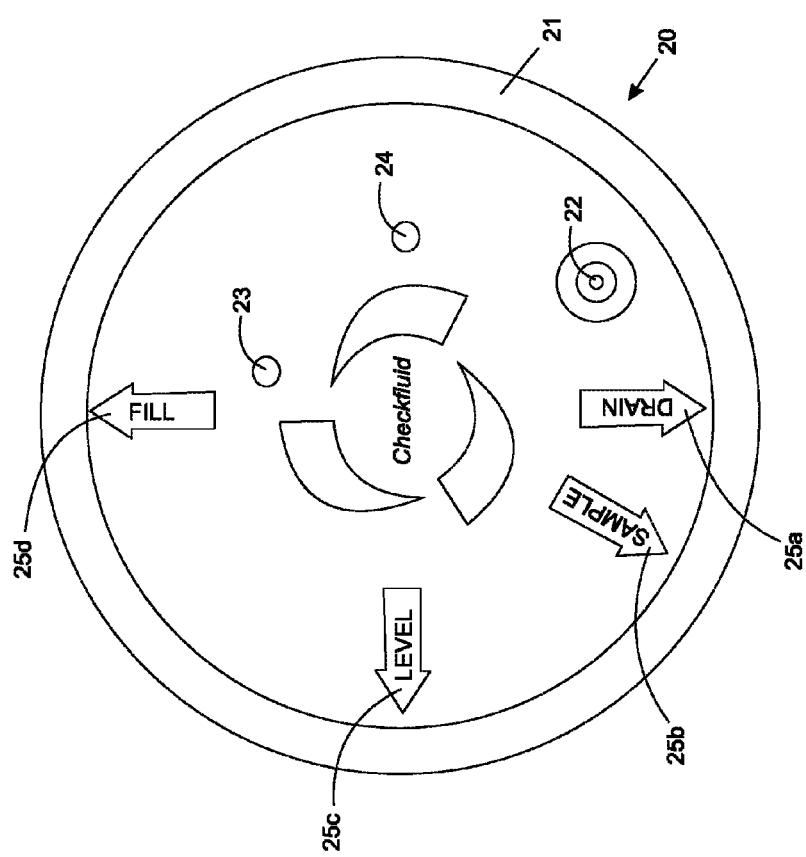
FIG. 2A is a schematic drawing showing a front view of an apparatus of the present invention.
Figure 2B:
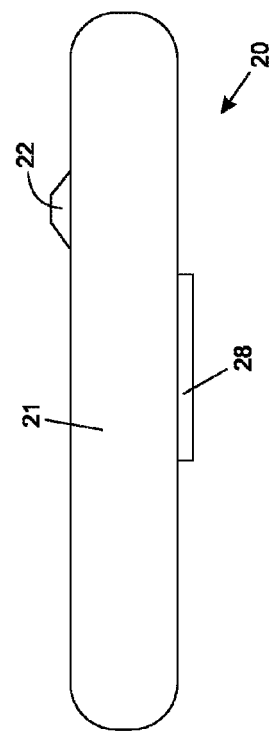
FIG. 2B is a schematic drawing showing a side view of the apparatus of FIG. 2A.

Referring to FIG. 2A and FIG. 2B, schematic drawings show a front view (FIG. 2A) and a side view (FIG. 2B) of an apparatus 20 of the present invention. Circular housing 21 encloses a position sensor in electronic communication with a wireless transceiver. On/off switch 22 controls power from a battery that provides power to electronic components in the apparatus. Light 23 indicates if the apparatus is on or off. Indicator light 24 indicates if the position sensor is in the predetermined reference position, which in turn is an indication of whether the oil port is positioned in the correct location. Arrows 25a-25d are indicia printed circumferentially on the circular housing so that the arrows point outward along radially-spaced part radii. The arrows show different service action positions, the service action for which each arrow is an indicator being printed in text on the arrows. The service actions are drain 25a, sample 25b, level 25c and fill 25d. With reference to FIG. 2B, magnet 28 affixed to the back of the apparatus may be used to mount the apparatus on a ferrous surface of a wheel or track of a vehicle.

Figure 3:
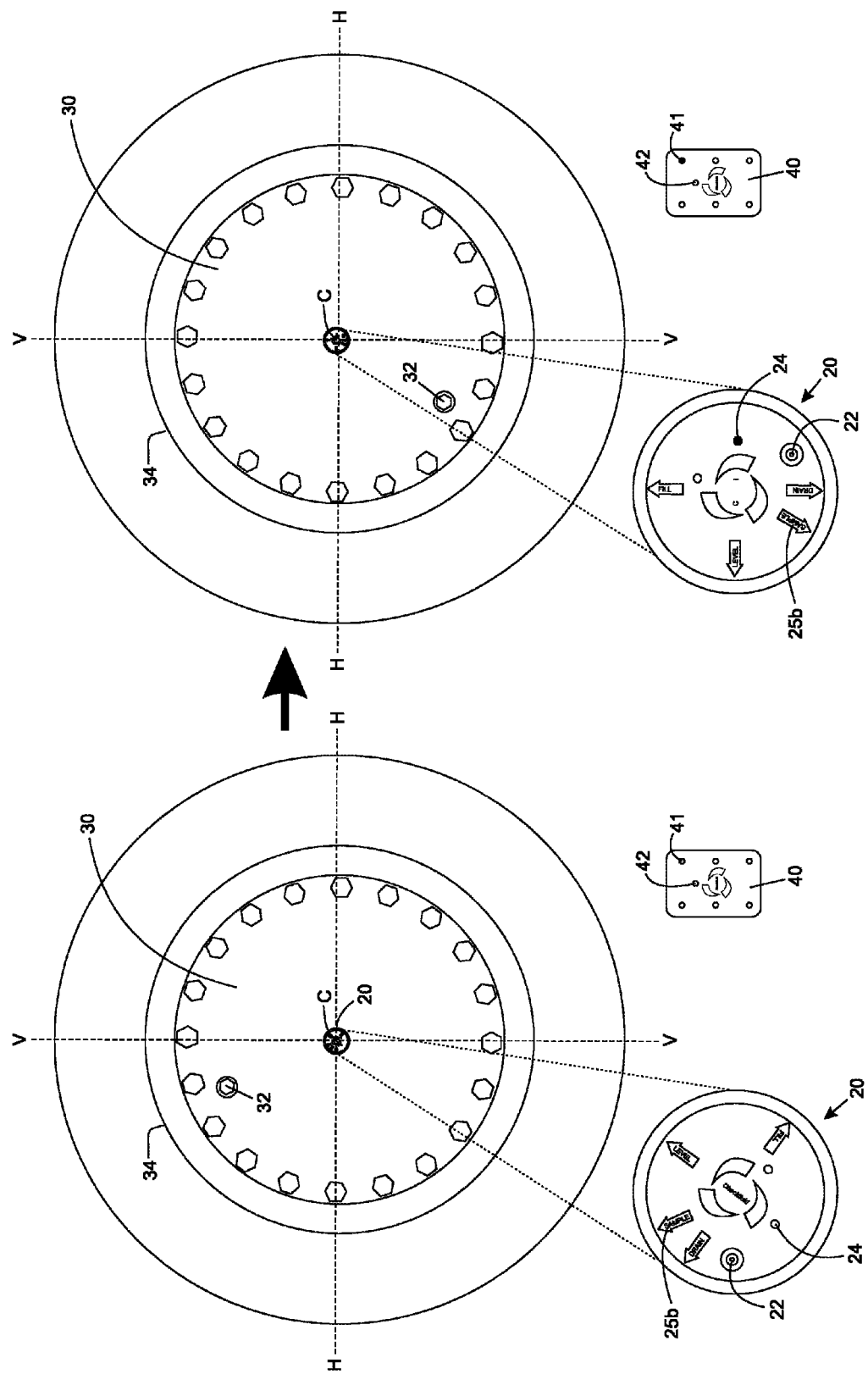
FIG. 3 is a schematic drawing showing the apparatus of FIG. 2 positioned on a wheel of a vehicle as the wheel rotates from one position to another together with a hand held receiver indicating status of a position sensor in the apparatus.

FIG. 3 is a schematic drawing showing the position of the apparatus 20 of FIG. 2 on a wheel 30 of a large truck. The wheel 30 comprises oil port 32 plugged with an oil plug and proximal edge 34 of the wheel 30.

Referring to the left side of FIG. 3, the wheel starts in a position wherein oil port 32 is above horizontal axis H-H and to the left of vertical axis V-V. The horizontal and vertical axes are perpendicular to each other and perpendicular to the axis of rotation of the wheel. In this case, the desired service action is to sample the oil, therefore the apparatus 20 is mounted on wheel 30 so that center point C of the apparatus is on or near the axis of rotation of the wheel, i.e. the center of the wheel. Arrow 25b (indicating SAMPLE) is pointed at oil port 32 when the apparatus is mounted on the wheel. Because the wheel comprises a ferrous metal, the magnet is able to temporarily secure the apparatus in position on the wheel. The apparatus is switched on by an operator with on/off switch 22 and the operator switches on the hand held receiver 40 and takes it to the cab of the vehicle. When indicator light 42 on the receiver is on, it is an indication that the receiver is on. The receiver is configured so that indicator light 41 indicates the status of apparatus 20. Because the oil port 32 is not in the proper position for sampling, indicator light 41 on the receiver and indicator light 24 on the apparatus are off. To move the oil port to the correct position for sampling, the operator drives the vehicle forward or backward to rotate the wheel.

Referring to the right side of FIG. 3, driving the vehicle rotates the wheel 30 thereby changing the position of oil port 32 in relation to the horizontal H-H and vertical V-V axes. When the oil port is about 30° from the vertical axes below the horizontal axis as seen in the right side of FIG. 3, the oil port is in the correct position for sampling and indicator lights 41 and 24 on the receiver and apparatus, respectively, are switched on. Since the receiver 40 is in the cab of the vehicle with the operator, the operator now knows that the oil port is properly positioned and can stop driving. The operator can now leave the cab to perform the service action.

The novel features of the present invention will become apparent to those of skill in the art upon examination of the detailed description of the invention. It should be understood, however, that the scope of the claims should not be limited by the preferred embodiments set forth in the examples, but should be given the broadest interpretation consistent with the specification as a whole.

The invention claimed is:

1. A portable apparatus for sensing position of an oil port on a rotating element of a heavy equipment vehicle, the apparatus comprising:
   a position sensor that senses angular position of the oil port and in electrical communication with a wireless transmitter, the wireless transmitter configured to receive angular position signals from the position sensor and for sending signals that correspond to the received angular position signals to a wireless receiver that comprises at least one indicator;
   a mounting structure for temporarily mounting the apparatus on the rotating element; and,
   an indicium on the apparatus associated with a desired oil service action to be performed on the rotating element, wherein the temporary mounting of the apparatus is chosen at an orientation such that the indicium correlates and indicates an angular position of the oil port with respect to a pre-determined reference angular position reading of the position sensor;
   wherein the correlation is programmed with respect to the at least one indicator on the wireless receiver to indicate when the angular position of the oil port is being a correct angular position for performing the desired oil service action in response to the wireless receiver receiving an angular position signal corresponding to an angular position of the pre-determined reference angular position reading.

2. A method for correctly indicating angular positioning of an oil port on a rotating element of a heavy equipment vehicle for performing a desired oil service action on the rotating element, comprising:
   mounting a portable apparatus as defined in claim 1 on the rotating element so that the indicium points at the oil port to provide a corresponding angular position signal, wherein the portable apparatus cooperates with the wireless receiver of claim 1;
   receiving the angular position signal detected by the position sensor from the wireless transmitter with the wireless receiver;
   indicating on the at least one indicator of the wireless receiver the angular position of the oil port; and
   operating the vehicle to rotate the rotating element until the at least one indicator of the wireless receiver indicates that the oil port is in the correct position when the wireless receiver receiving an angular position signal corresponding to an angular position of the pre-determined reference angular position reading, to permit performance of the desired oil service action.

* * * * *